United States Patent [19]
Phillips

[11] Patent Number: 5,310,327
[45] Date of Patent: May 10, 1994

[54] WORKPIECE DEFLECTOR SHIELD FOR AN INJECTION MOLDING APPARATUS

[76] Inventor: Reginald Phillips, 3633 W. Grenshaw St., Chicago, Ill. 60624

[21] Appl. No.: 38,819

[22] Filed: Mar. 29, 1993

[51] Int. Cl.⁵ .............................................. B29C 45/84
[52] U.S. Cl. .................................... 425/151; 264/334; 425/556
[58] Field of Search ................ 425/151, 556; 264/334

[56] References Cited
U.S. PATENT DOCUMENTS
4,911,630  3/1990  Uehara ................................. 425/151

Primary Examiner—Tim Heitbrink
Attorney, Agent, or Firm—Leon Gilden

[57] ABSTRACT

A workpiece deflector shield includes a flexible web arranged for extension and retraction relative to separable mold halves that are arranged in operative relationship relative to one another from a first engaged positioned to a second spaced relationship, wherein in the spaced relationship, the flexible shield structure provides for deflection of a workpiece ejected from the separated mold members.

4 Claims, 4 Drawing Sheets

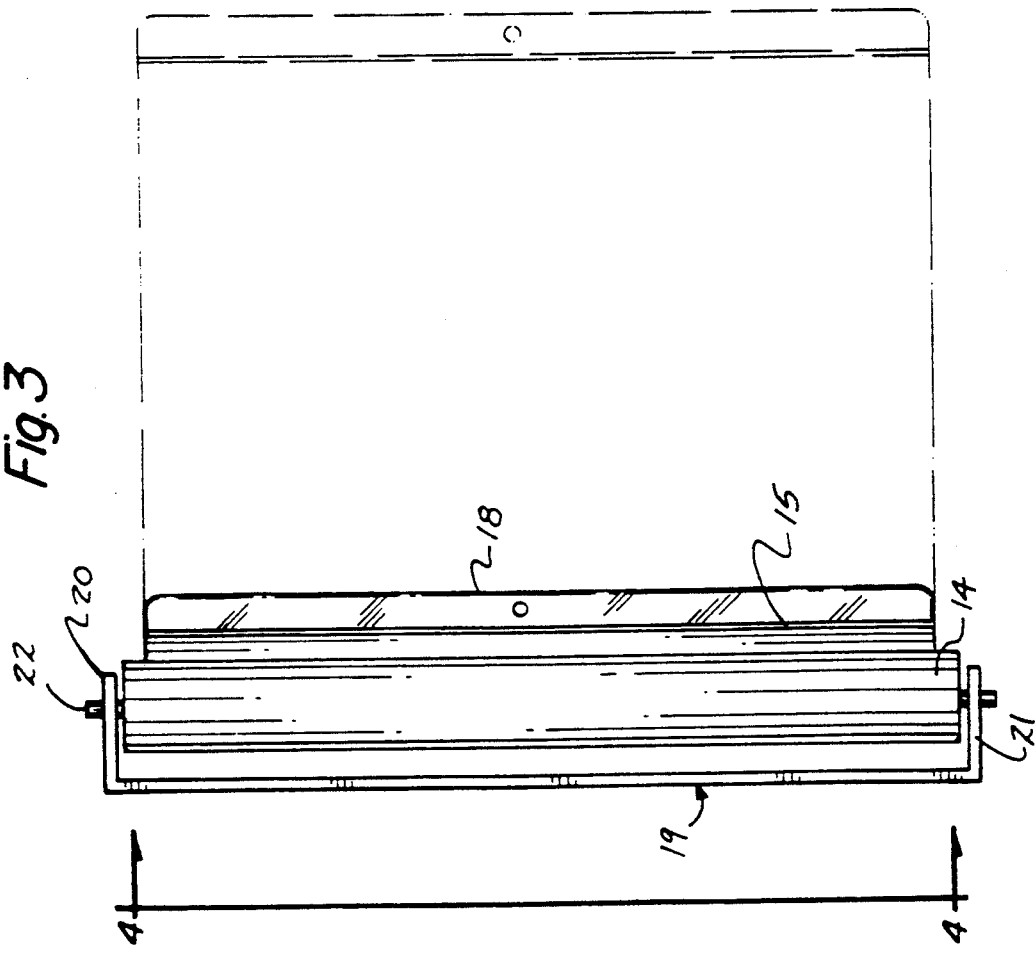

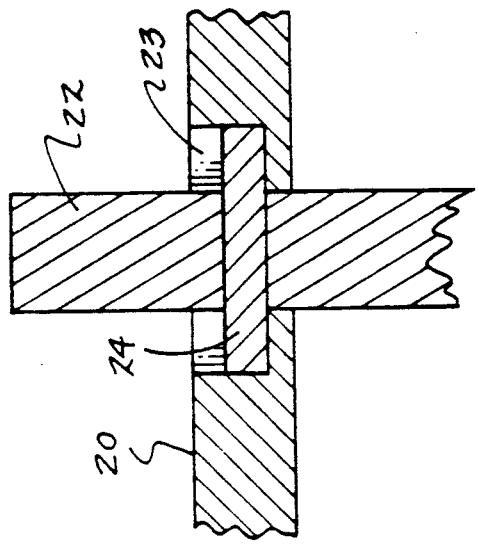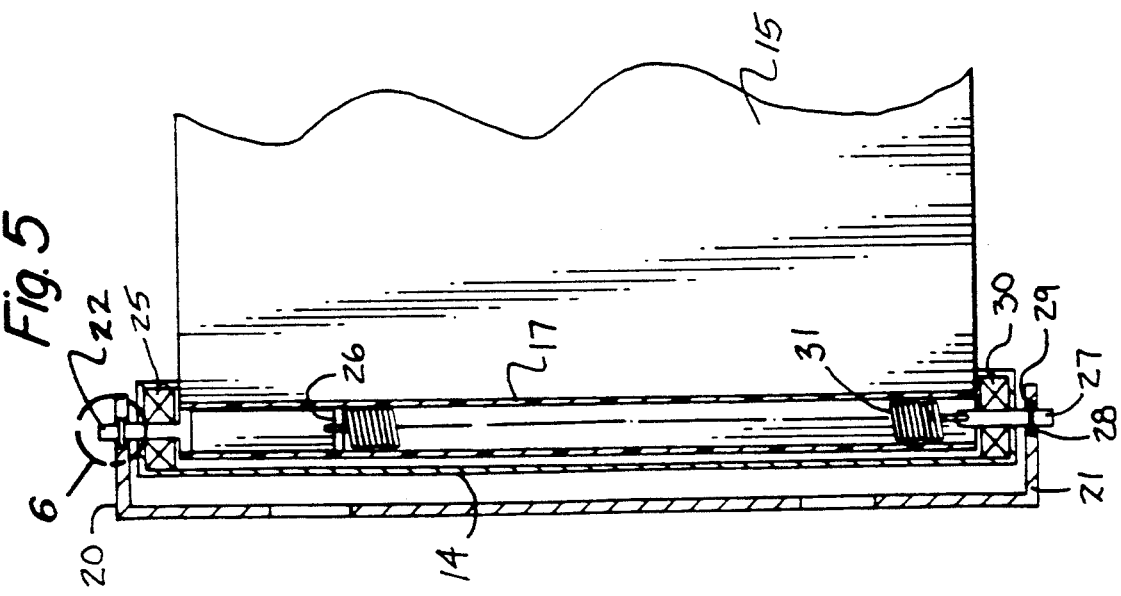

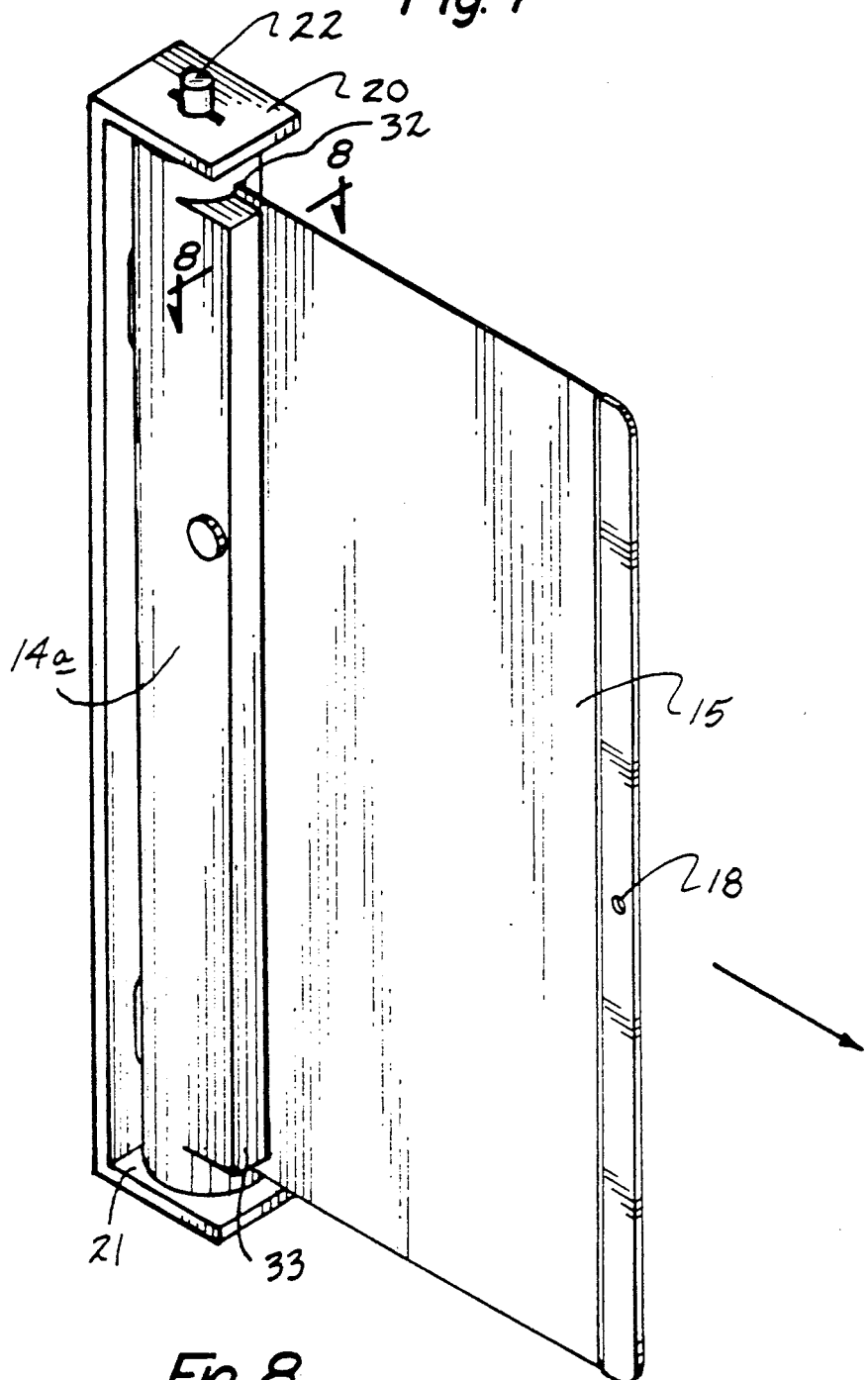
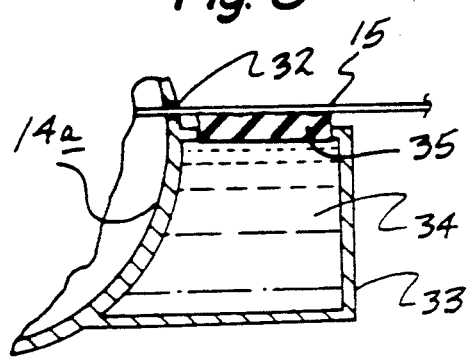

WORKPIECE DEFLECTOR SHIELD FOR AN INJECTION MOLDING APPARATUS

BACKGROUND OF THE INVENTION

1. Field of the Invention

The field of invention relates to injection mold apparatus, and more particularly pertains to a new and improved workpiece deflection shield apparatus wherein the same is addressed to the deflection of an ejected workpiece from mold structure to an underlying receiving position.

2. Description of the Prior Art

Injection molding is known in the prior art, wherein cooperative injection molds are indicated in U.S. Pat. No. 3,968,829 to Nakata. U.S. Pat. No. 4,543,021 to Adler indicates the use of a rigid shield structure relative to a work station such as a drill press and the like.

The instant invention attempts to overcome deficiencies of the prior art by incorporating a flexible web structure arranged to extend and retract relative to a web housing between cooperative injection molds that are arranged for reciprocation relative to one another and in this respect, the present invention substantially fulfills this need.

SUMMARY OF THE INVENTION

In view of the foregoing disadvantages inherent in the known types of shield apparatus now present in the prior art, the present invention provides a workpiece deflection shield apparatus wherein the same is directed to the extension and retraction in a mounted relationship relative to reciprocating injection mold structure. As such, the general purpose of the present invention, which will be described subsequently in greater detail, is to provide a new and improved workpiece deflection shield apparatus which has all the advantages of the prior art shield apparatus and none of the disadvantages.

To attain this, the present invention provides a workpiece deflector shield including a flexible web arranged for extension and retraction relative to separable mold halves that are arranged in operative relationship relative to one another from a first engaged position to a second spaced relationship, wherein in the spaced relationship, the flexible shield structure provides for deflection of a workpiece ejected from the separated mold members.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved workpiece deflection shield apparatus which has all the advantages of the prior art shield apparatus and none of the disadvantages.

It is another object of the present invention to provide a new and improved workpiece deflection shield apparatus which may be easily and efficiently manufactured and marketed.

It is a further object of the present invention to provide a new and improved workpiece deflection shield apparatus which is of a durable and reliable construction.

An even further object of the present invention is to provide a new and improved workpiece deflection shield apparatus which is susceptible of a low cost of manufacture with regard to both materials and labor, and which accordingly is then susceptible of low prices of sale to the consuming public, thereby making such workpiece deflection shield apparatus economically available to the buying public.

Still yet another object of the present invention is to provide a new and improved workpiece deflection shield apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings therein:

FIG. 3 is an enlarged orthographic view of the shield structure associated with the support housing.

FIG. 4 is an orthographic view, taken along the lines 4—4 of FIG. 3 in the direction indicated by the arrows.

FIG. 5 is an orthographic view, taken along the lines 5—5 of FIG. 4 in the direction indicated by the arrows.

FIG. 6 is an enlarged orthographic view of section 6 as set forth in FIG. 5.

FIG. 7 is an isometric illustration of a modified shield housing as contemplated by the invention.

FIG. 8 is an orthographic view, taken along the lines 8—8 of FIG. 7 in the direction indicated by the arrows.

DESCRIPTION OF THE PREFERRED EMBODIMENT

Figure 1:
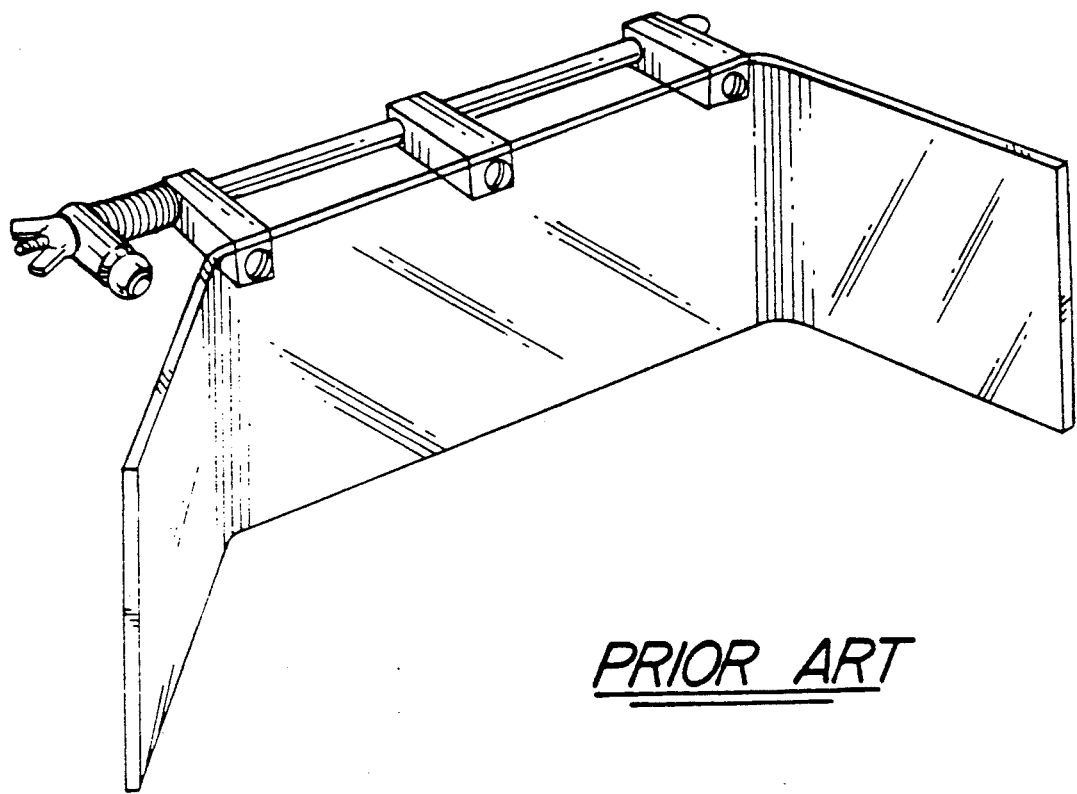
FIG. 1 is an isometric illustration of a prior art rigid shield structure, as indicated in U.S. Pat. No. 4,543,021.

With reference now to the drawings, and in particular to FIGS. 1 to 8 thereof, a new and improved workpiece deflection shield apparatus embodying the principles and concepts of the present invention and generally designated by the reference numeral 10 will be described.

Figure 2:
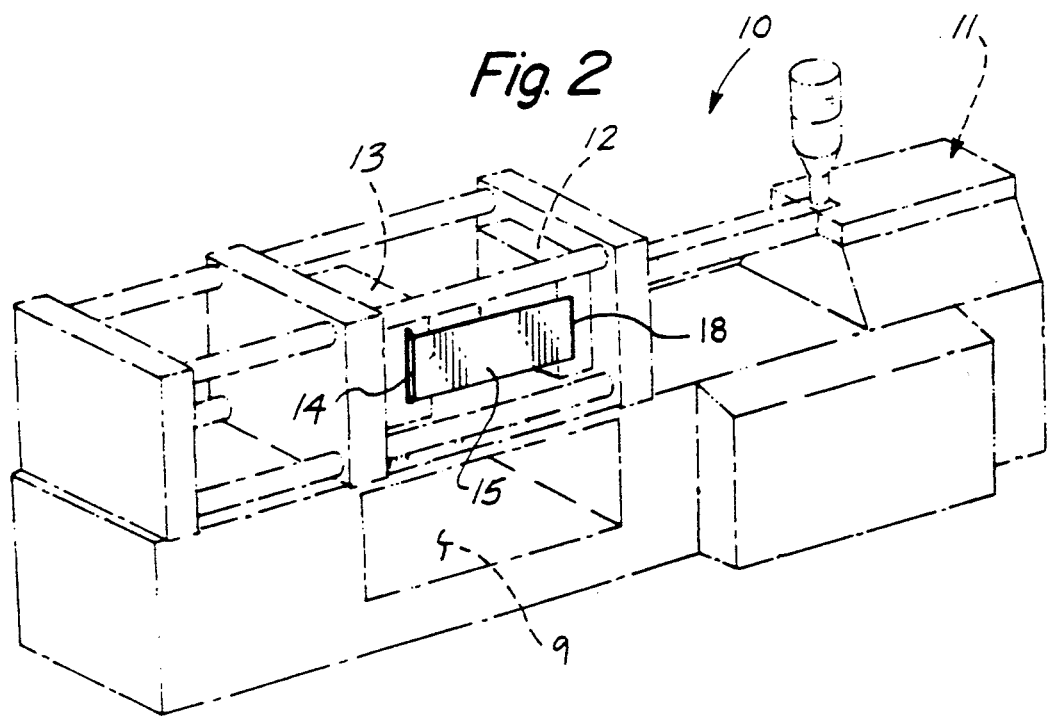
FIG. 2 is an isometric illustration of the invention mounted to an associated ejection molding apparatus.

More specifically, the workpiece deflection shield apparatus 10 of the instant invention essentially comprises cooperation with an injection mold apparatus 11, as indicated in FIG. 2, having cooperative and reciprocatably mounted first and second mold members 12 and 13 of a type such as indicated in U.S. Pat. No. 3,968,829 incorporated herein by reference. A shield housing 14 is mounted to one of said mold members, with the flexible web shield 15 having a shield first end mounted to a web support tube 17 within the shield housing 14, with a web second end mounted to an opposing mold member. A support bracket 19 is arranged for support of the shield housing 14. The support bracket 19 includes respective first and second parallel legs 20 and 21, wherein a support tube first axle 22 fixedly secured to a first end of a tube 17 rotatably extends through the first leg 20, with the first leg 20 having a first leg recess 23 and the first axle 22 projecting therethrough, and the first axle including a first axle abutment ring 24 positioning the first axle within a first leg recess 23 to position and align the first axle within and relative to the first leg 20. A first axle bearing 25 within the shield housing 14 receives the first axle therethrough for rotative support of the first axle 22. A support tube mounting leg 26 is positioned within the support tube 17, with a second axle 27 mounted through a second end of the support tube 17, with the second axle received through a second leg recess 28 within the second leg 21. A second axle abutment ring 29 fixedly mounted to the second axle 27 positions the second axle within the second leg recess 28, and in this manner, the first and second axle abutment rings 24 and 29 provide alignment and positioning of the support tube structure relative to the housing 14 and the support bracket 19. Further, a second axle bearing 30 mounted to the housing rotatively receives a second axle therethrough.

A biasing spring 31 mounted within the support tube 17 has a spring first end mounted to a support tube mounting leg 26 positioned within the support tube intermediate the support tube first and second ends. A second end of the biasing spring 31 is mounted to the second axle 27, whereupon rotation of the support tube 17 upon displacement of the web shield 15 from within the housing 14 biases the spring 31 to permit return of the web shield 15 about the support tube 17 when the first and second molds are arranged in contiguous relationship in a first position relative to their displacement in a second position, as illustrated in FIG. 2.

As illustrated in FIG. 7, the housing may be configured as a modified housing 14a, wherein as noted, a housing feed slot 32 feeds the web 15 in an aligned relationship through the housing 14 and 14a. Further, the modified housing 14a includes a reservoir housing 33 that is arranged substantially coextensive with the feed slot 32 and the web 15 to direct a lubricant fluid 34 from within the reservoir housing through a reservoir housing fluid permeable sponge 35 directed coextensively with the housing in adjacency to the feed slot 32 in contiguous communication with the web shield 15 that is directed therealong. The lubricant in this manner is directed along the web shield to the web shield surface facing the first and second mold members 11 and 12, whereupon in this manner the deflection of a workpiece from the web shield is insured to provide for limited marring and damage to a workpiece directed from the molds 11 and 12 subsequent to an ejection molding procedure. The workpiece in this manner then drops to a workpiece receiving area 9, as indicated in FIG. 2, below the first and second mold members 12 and 13 for either accumulation or conveyance in any desired manner relative to the molding apparatus 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A workpiece deflection shield apparatus, comprising, an injection mold having a first mold member, and a second mold member, the first mold member and the second mold member arranged for reciprocation relative to one another, and a workpiece receiving area positioned below the first mold member and the second mold member, a shield housing, the shield housing having a support bracket mounting the shield housing to said first mold member, and the shield housing including a web support tube rotatably mounted within the shield housing, a flexible web shield, with a first end of the flexible web shield mounted to the support tube, and a second end of the web shield mounted to the second mold member, the shield housing includes an elongate feed slot receiving the web shield therethrough in guiding the web shield from the shield housing to the second mold member, and the web support tube includes a support tube first end and a support tube second end, the support tube first end includes a first axle, and the support bracket includes a first leg spaced from and parallel a second leg, and the first axle is rotatably received through the first leg, the first leg having a first leg recess, and the first axle having a first axle abutment ring, with the first axle abutment ring mounted within the first leg recess, and the first axle fixedly mounted to the support tube, and a second axle rotatably mounted relative to the support tube second end, with the second axle rotatably received through the second leg, and the second leg having a second leg recess, and the second axle having a second axle abutment ring received within the recess to position the second axle within the second leg.

2. An apparatus as set forth in claim 1 with a mounting leg fixedly mounted within the support tube intermediate the tube first end and the tube second end, and a biasing spring, the biasing spring having a first end fixedly mounted to the mounting leg, and the biasing spring including a biasing spring second end, and the biasing spring second end mounted to the second axle within the support tube.

3. An apparatus as set forth in claim 2 wherein the shield housing includes a first bearing mounted within the shield housing receiving a first axle therethrough, and the shield housing having a second bearing receiving a second axle therethrough.

4. An apparatus as set forth in claim 3 including a reservoir housing fixedly mounted to the shield housing coextensive with the feed slot, and the reservoir housing having a lubricant fluid contained therewithin, and a fluid permeable sponge mounted to the reservoir housing coextensive with the reservoir housing and the feed slot in contiguous communication with the web shield to direct lubricant fluid onto a first surface of the web shield, with the web shield arranged in a facing relationship to the first mold member and the second mold member.

* * * * *